July 9, 1946.  T. A. BOWERS  2,403,574
PISTON AND PISTON RING IMPROVEMENT
Filed Feb. 25, 1944  2 Sheets-Sheet 1
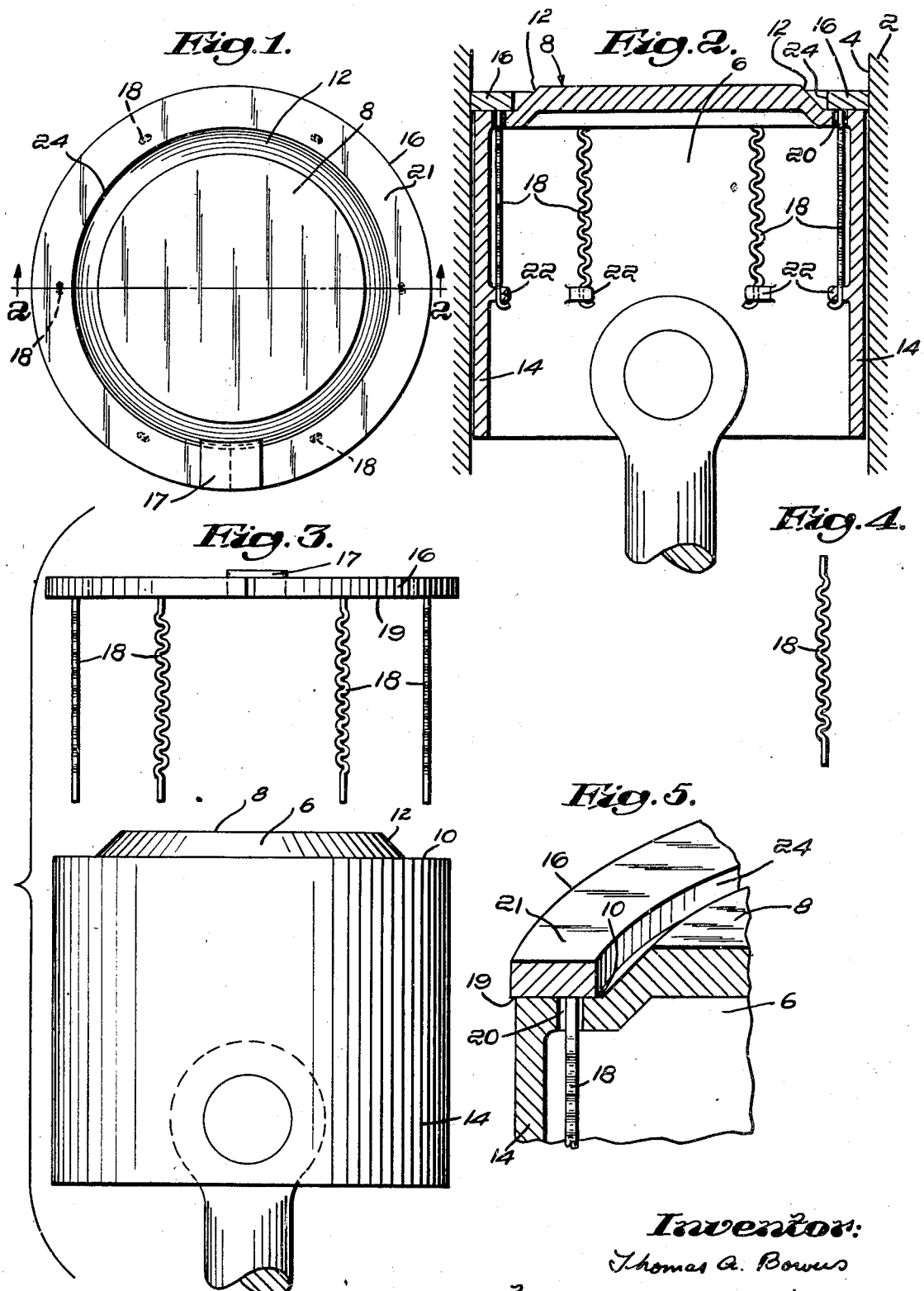
Inventor:
Thomas A. Bowers
by Munn H Hamilton
Attorney July 9, 1946.  T. A. BOWERS  2,403,574
PISTON AND PISTON RING IMPROVEMENT
Filed Feb. 25, 1944    2 Sheets-Sheet 2

Inventor:
Thomas A. Bowers

Patented July 9, 1946

2,403,574

UNITED STATES PATENT OFFICE 2,403,574

PISTON AND PISTON RING IMPROVEMENT

Thomas A. Bowers, Mattapoisett, Mass.; Elizabeth M. Bowers, administratrix of said Thomas A. Bowers, deceased, assignor of two-thirds to Munroe H. Hamilton, Lexington, Mass.

Application February 25, 1944, Serial No. 523,790

8 Claims. (Cl. 309—4)

This invention relates to pistons and piston rings, and its objects are to improve devices of this character and to provide means for more efficiently sealing a piston in a cylinder, with a view to controlling cylinder and ring wear and to avoiding difficulties arising in connection with blowby and carbon deposits. Another object of the invention is to deal with the wear which results from a piston ring being free to move in a piston groove, as for example hammering of the ring in the piston groove; "slap" of the piston against the cylinder wall; tipping of a ring so that an edge is intermittently forced with fluctuating pressures against the cylinder periphery, and other causes. The invention further includes among its objects a decrease in the number of piston rings required to seal a piston, reduction in the size and weight of pistons, and other changes directed generally to increasing the efficiency of internal combustion motors.

In the accompanying drawings:

Fig. 1 is a plan view illustrating a piston and piston ring of the invention;

Fig. 2 is a vertical cross section taken on the line 2—2 of Fig. 1;

Fig. 3 is a view in side elevation of the ring and piston of the invention with the ring removed;

Fig. 4 is a detail view of a spring member;

Fig. 5 is an enlarged fragmentary perspective view further illustrating the ring and piston;

Figure 6:
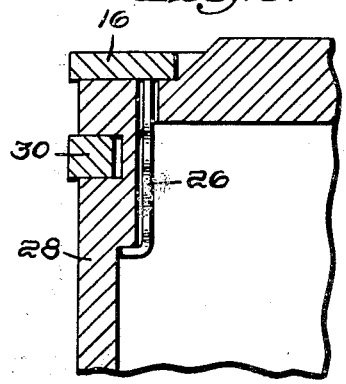
Figs. 6, 7 and 8 illustrate modified spring fastening means for a piston and ring assembly such as that indicated in Figs. 1–5 inclusive.

The invention generally includes a piston formed with a single seating surface, a piston ring member, and spring means for urging the ring member axially downward into continuously seated relation with respect to the piston seating surface. The spring means is especially arranged to exert a force acting in an axial direction away from the head of the piston, and provides a light tension which, while maintaining the ring in seated relation, permits the ring to flex radially and to exert a definite wall pressure on a cylinder. In addition, the ring is mounted at the top of the piston so that it is subject to combustion gas pressure, and its upper side lies directly in the combustion chamber with the piston ring being free from contact or close proximity to any overhanging surface on which carbon may be deposited.

Referring more in detail to the drawings, numeral 2 denotes a cylinder having an inner peripheral surface 4. Mounted within the cylinder 2, in spaced relation to the peripheral surface 4, is a piston 6, secured to a crank member and presenting a flat head 8. Extending around the top of the piston 6, at a level slightly below the surface of the head 8, is a piston seating surface 10 and the outside of the piston is cut away to form a beveled surface 12 as shown on Figs. 2 and 3.

The piston 6 is of a relatively light construction with the thickness of the skirt portion 14 being maintained the same all the way up to the top of the piston, and no reinforcing being provided for piston ring grooves. The head of the piston is similarly formed of a relatively thin body of metal and the height of the piston, considered axially, is shortened to an extent corresponding to the space which is ordinarily provided for conventional piston ring grooves.

Mounted around the piston on the seating surface 10 is a ring member 16 having a seating surface 19 which may, for example, consist of a split ring of the type commonly referred to as a "C type" ring whose ends are normally spaced apart as shown in Fig. 3. The ring is mounted on the cylinder 2 in a compacted position in which the ring tends to revert to its normal position and thus exert a wall pressure against the cylinder wall and provide radial flexibility. 17 denotes a gap closing member overlying the ends of the ring.

At the under side of the ring 16 is secured a plurality of spring members 18 which may for example comprise a strip of corrugated steel or a coiled spring, or some other well known type of spring. The spring members may conveniently consist of a group of six of these members spaced apart and secured to the ring by welding or some other suitable fastening. Located through the piston seating surface 10 are openings 20 through which the spring members are allowed to extend with a clearance being provided so that the spring may move with the ring 16 in a direction radially of the piston. The lower ends of the springs, in an extended position, are attached at a point within the piston, as for example to projections 22. In this position the ring is provided with an axial tension which continually urges the seating surface 19 against the piston seat 10 and provides a gas seal of improved character. The axial tension resulting from the use of the springs 18 is of a limited degree which permits the ring to develop a suitable radial flexibility and wall pressure so that the ring periphery will constantly adhere to the cylinder periphery 4.

In operation, the axial or vertical tension resulting from the association of the springs with the ring 16, maintains the seating surface 19 of the ring in continuously sealed relation with respect to the piston sealing surface 10. There is thus achieved a permanent seal which is not broken at the time the piston changes the direction of its stroke, as is the case with conventional rings. At the same time the ring is free to flex in a radial direction with the ring seating surface sliding in and out on the piston seating surface and thus allowing the ring to conform to any irregularity which may be present in the periphery 4 of the cylinder. The arrangement of the ring at the top of the piston results in the upper surface 21 and the inner peripheral surface 24 lying directly in the combustion chamber. Combustion gas pressure is thus allowed to act on the ring to tightly seal it against the seat 10 in a very efficient manner and at the same time vertical tension is developed from a point lower down in the piston. The efficiency of the seal at all times protects the spring members so that they are not subjected to the combustion gases. The ring and piston thus work in combination with one another to prevent axial displacement of the ring relative to the piston, particularly at the time the piston changes its stroke, and yet the ring is permitted to move radially and to be entirely subject to combustion gas pressure for sealing purposes.

The continuously seated relation of the ring with respect to the piston operates to advantage especially at those points at which the piston changes the direction of its stroke at the top of the cylinder. In ordinary ring installations, a ring at the time the piston changes its stroke may, due to its momentum, leave its seat in the piston groove and comes to rest with a definite impact against the other side of the groove. The spring means prevents axial movement of the ring and in so doing eliminates a series of impacts, often termed "hammering," which may appreciably wear the surface of the piston seat or the ring itself, and makes it impossible to maintain a tight seal to exclude gas pressure. Only a very little wear is necessary to create a tiny crack or space into which hot combustion gases can enter and burn the seating surfaces which must be lubricated at all times. Once the lubricant is burned, then wear proceeds at a greatly accelerated pace.

Another feature in the operation of the ring, running in continuously seated relation, is control of piston "slap" against the cylinder or against the inner periphery of the ring and thus indirectly against the cylinder. The axial tension of the ring creates a friction between the ring seating surface and the piston seating surface and in order for the piston to slap, it must overcome this friction force. The result is that the ring functions as a brake or cushion which is effective in converting the side thrust of the piston from a sharp impact into a rapidly increasing pressure and the wear of such piston movement is largely overcome.

In conjunction with its braking or cushioning function, the continuously seated ring also serves to reduce wear from piston slap in another way. The axial tension of the ring portions on the piston land surface tends to prevent the piston from assuming an angular position, or one in which its axis is out of alinement with the axis of the cylinder, such as commonly occurs at the instant of change of direction of the piston stroke. Contact of the piston against the inner periphery of a conventional ring, while the piston is in an angularly disposed position, either results in slightly tipping one side of the ring itself or in causing an upper edge of the ring to bear non-uniformly against the cylinder periphery, and in either case excessive cylinder wear occurs. The effect of the axial tension on the piston tends to keep the piston from assuming an angular position and tipping the ring. In this way, wear is also reduced at those points where the skirt of the piston strikes against the cylinder wall.

A very substantial degree of protection for the ring surface 19 and the land surface 10 is afforded by preventing wear in the several respects noted. As a result I obtain an exceedingly efficient seal between the two surfaces, and the seal is characterized by long life and dependability to a point where it becomes practical to rely on a single ring in place of several as conventionally required.

The arrangement of the ring at the top of the piston has already been referred to in connection with allowing combustion gases to act on the ring and provide for a tight seal. The same arrangement is also designed to provide a means of controlling carbon deposits, a substance which is formed from combustion gases and which may destroy the seal between a ring and its seat, or which may jam the ring in a piston groove. In conventional ring installations, the ring being free to slap in a piston groove, continually shakes itself free of carbon deposits and this is a principal reason for such a slap. In the ring of the invention, there are only two sides on which carbon may be deposited, i. e., the top side 21 and the inner periphery 24. Since there is no piston groove present, there is no opportunity for carbon to jam at the top of the ring.

To take care of the inner periphery of the ring, the piston has been cut away to form the bevel surface 12. As the ring reciprocates in a cylinder, it moves radially in and out on its seat and any carbon which is deposited between the inner periphery of the ring and the beveled surface, on the seat 10, is broken up and forced upward on to the top of the piston where it is blown out with exhaust gases. The sharp lower edge of the ring 16, lying on the seat 10, under tension, acts like a chisel which continually cuts away any carbon deposit on the seat. Another factor in the control of carbon deposit is the efficient seal between the ring and piston at all times which keeps oil from passing up around the ring and becoming burned.

The ring further operates in a highly efficient manner due to changes in size and weight which are obtained by the piston and ring assembly described. Since the ring is mounted at the top of the piston and its seal is permanently maintained, the need for piston ring grooves around the head of the piston is avoided, and the usual thick reinforced piston head construction, designed to provide for such grooves being cut into the piston, is done away with. The length of the piston may also be reduced as the space required by the rings is no longer necessary, and the size of the cylinder block may also be decreased or shortened. The result of these changes is to greatly lighten the piston and generally increase the efficiency of the motor.

Figure 7:
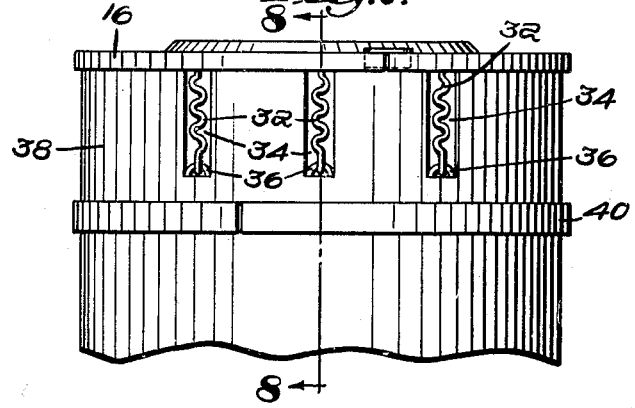
Figure 8:
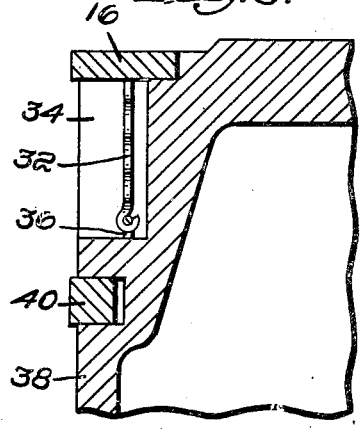

Attachment of the ring of Figs. 1–5 inclusive may be carried out in other ways, as for example as illustrated in Figs. 6, 7 and 8. In Fig. 6 I have illustrated ring 16 secured by means of a spring 26 which may be engaged under an edge or shoulder formed in the piston wall 28. This figure also illustrates the use of a second ring 30 of conventional type mounted below the ring 16 and adapted to function as an oil scraping ring or in some other way, if so desired. In Figs. 7 and 8 I have illustrated another form of attachment in which springs 32 are hooked into eyes 36 mounted in recesses 34 formed at the outside of the piston 38. This permits the ring to be secured from a point outside the piston. With this arrangement also I may desire to provide a second oil ring 40.

Figure 9:
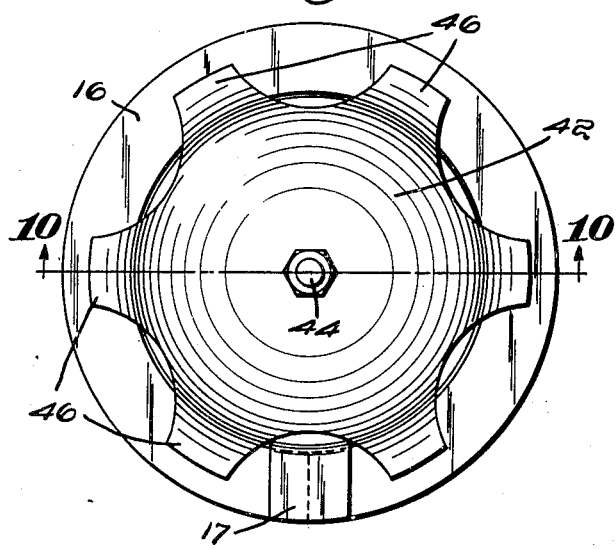
Figs. 9 and 10 are plan and cross sectional views respectively of a modification of piston and ring assembly.
Figure 10:
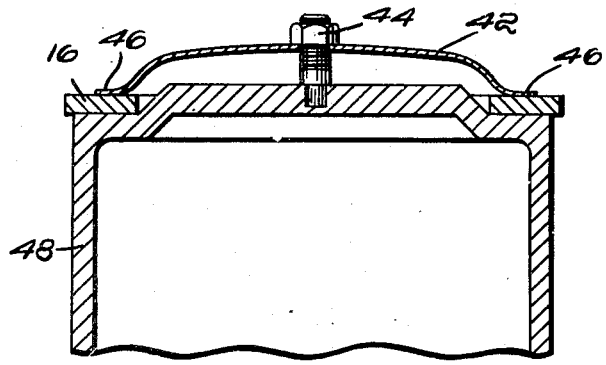

Figs. 9 and 10 illustrate a modification of piston and ring assembly in which the ring member 16 is held against its seat under vertical tension by means for developing the tension from a point above the ring instead of below it, as was the case in Figs. 1–8 inclusive. 42 denotes a thin metal cap secured to the head of a piston 48 by a bolt and nut 44. The cap is formed with a plurality of resilient fingers 46 which are urged against the ring 16 with a limited degree of pressure which holds the ring against its seat and permits it to flex radially.

Figure 11:
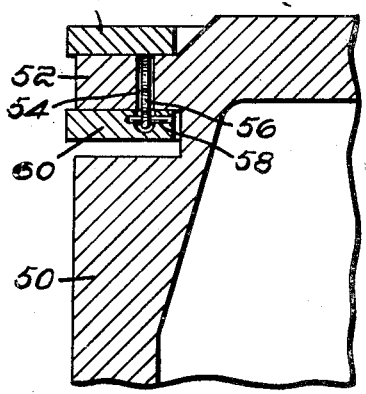
Fig. 11 is a fragmentary cross sectional view illustrating still another modification of piston and ring assembly.

Fig. 11 illustrates still another modification of piston ring and piston assembly in which the ring is held against its seat under vertical tension. This tension force is developed by clamping two rings against opposite sides of a piston land or rib. 50 denotes a piston formed with a land or rib 52 at either side of which are rings 16 and 60 held in a resiliently clamped relation by means of a spring 56 extending through an opening 54 in the land and anchored by a pin 58. Various other changes may be resorted to.

Considering the advantages of the ring and particularly the advantages which accrue from holding the ring down in a continuously seated relation on the land surface, it is pointed out that no sharp slap or impact occurs between the ring and piston land surface 10 at any time during the stroke of the piston and as a result the piston land surface is appreciably protected from wear and a level seating surface is preserved throughout the life of the ring, against which the seating surface 19 of the ring may be squarely held and a more efficient seal obtained. Reduction of wear from the ring being tipped is also accomplished by the braking or cushioning action of the axial tension, and "blowby" is greatly minimized. By providing a seal which is always maintained and protected from wear in the several ways noted, one ring may be utilized to do the work of several, and at the same time the cost of forming a piston with a plurality of piston ring grooves may be eliminated. The piston itself may be decreased in length since the space in which the ring grooves are commonly formed is no longer required. By thus shortening the length of the piston, it is possible to decrease the height of the cylinder block and thus to decrease the total weight of a motor, with an increase in efficiency. The piston itself, in addition to being made shorter, may also be of lighter construction, owing to the fact that reinforced portions commonly required to provide for piston ring grooves may be eliminated.

While I have shown a preferred embodiment of my invention, it should be understood that various changes and modifications may be resorted to, in keeping with the spirit of the invention as defined by the appended claims.

I claim:

1. In combination, a piston having a circumferentially extending rib presenting a sealing surface, a piston ring mounted on said piston in contact with said sealing surfaces, and means connected to the piston ring and anchored in the piston below said sealing surface for urging the ring resiliently against said surface.

2. In combination, a piston having a sealing surface, a piston ring mounted on said surface spring means attached to said ring and to said piston for urging the ring continuously against said sealing surface, and said spring means extending across the said sealing surface in a direction axially of the ring.

3. In combination, a piston having a circumferentially extending rib presenting a sealing surface, a piston ring mounted on said piston in contact with said sealing surface and a plurality of springs attached to said piston ring and to said piston and acting to draw said ring against said sealing surface of the piston.

4. In combination, a piston having a sealing surface, a piston ring mounted on said surface and spring means attached to said piston ring, passing through said sealing surface and anchored to the piston, for urging the ring resiliently against the sealing surface.

5. In combination, a piston having a sealing surface, a piston ring mounted on said surface, and a plurality of spring members attached to said piston ring, passing through said sealing surface and anchored to the piston, said spring members resiliently urging said ring against said sealing surface while permitting it to move thereover radially of the piston.

6. A piston ring comprising a sealing member and a plurality of spring members attached thereto, said spring members adapted to be anchored in a piston and to urge said sealing member against a corresponding sealing surface of the piston.

7. In combination, a piston having a sealing surface, a piston ring mounted on said surface and a resilient cap attached to the piston extending into contact with the upper side of the piston ring and pressing it against the sealing surface of the piston.

8. In combination, a piston having a land extending therefrom, the upper side of said land presenting a sealing surface, a piston ring mounted on said sealing surface and a plurality of anchor members extending through said land and attached both to said piston ring and to an anchor member on the opposite side of said land.

THOMAS A. BOWERS.